United States Patent
Mills et al.

(10) Patent No.: US 6,559,215 B2
(45) Date of Patent: May 6, 2003

(54) SPIN-ON-DIELECTRIC COMPOSITIONS WITH COATING ENHANCER

(75) Inventors: Lynne K. Mills, Midland, MI (US); JoLee M. Dominowski, Linwood, MI (US); Gene D. Rose, Midland, MI (US); Deidre A. Strand, Midland, MI (US); Kenneth L. Foster, Midland, MI (US); Stephen F. Hahn, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/908,038

(22) Filed: Jul. 18, 2001

(65) Prior Publication Data

US 2002/0120053 A1 Aug. 29, 2002

Related U.S. Application Data

(60) Provisional application No. 60/219,155, filed on Jul. 19, 2000.

(51) Int. Cl.⁷ .................................................. C08K 5/07
(52) U.S. Cl. ..................................... 524/360; 524/502
(58) Field of Search ................................ 524/360, 502

(56) References Cited

U.S. PATENT DOCUMENTS

| | | | | |
|---|---|---|---|---|
| 5,274,026 A | * | 12/1993 | Benedikt | 524/553 |
| 5,965,679 A | | 10/1999 | Godschalx et al. | 526/281 |
| 6,291,628 B1 | * | 9/2001 | Chen | 528/169 |
| 6,358,559 B1 | * | 3/2002 | Hacker | 427/58 |
| 6,358,804 B2 | * | 3/2002 | Kobayashi | 438/301 |
| 6,402,315 B1 | * | 6/2002 | Kato | 347/100 |

FOREIGN PATENT DOCUMENTS

| | | | | |
|---|---|---|---|---|
| EP | 0 755 957 B1 | 5/1999 | | C08G/65/40 |
| WO | WO 97/10193 | 3/1997 | | C07C/22/08 |
| WO | WO 98/11149 | 3/1998 | | C08G/61/10 |
| WO | WO 99/38910 | 8/1999 | | C08J/3/09 |
| WO | WO 00/31163 | 6/2000 | | C08G/65/40 |

OTHER PUBLICATIONS

N. H. Hendricks et al., Polym. Prepr. (Am. Chem. Soc., Div. Polym. Chm.), vol. 37(1), pp. 150–151 (1996).
J. S. Drage et al., Material Res. Soc., Symp. Proc., vol. 476 (Low Dielectric Constant Materials III), pp. 121–128 (1997).
Handbook of Coating Additives, Chapter 5, Leveling and Flow Control, by Horst Vltavsky, pp. 119–144 (1987).
B. Daniels, et al., SPIE, vol. 631, Advances in Resist Technology and Processing III, *Surface Tension Effects in Microlithography—Striations* pp. 192–201 (1986).
A. Barton, CRC Handbook of Solubility Parameters and Other Cohesion Parameters, pp. 41, 95–99 (1991).
S. Paul, ed., Surface Coatings, Science & Technology, $2^{nd}$ Edition, *4.2.3 Hansen Solubility Parameters*, pp. 419–424 (1996).
D. Satas, ed., Coating Technology Handbook, Leveling of Brush and Striation Marks, pp. 40–41 (1991).
Z. Wicks, Organic Coatings: Science and Technology, Leveling, pp. 435–439 (1999).

* cited by examiner

*Primary Examiner*—Edward J. Cain

(57) ABSTRACT

This invention is a composition comprising (a) an oligomer or polymer dispersible in an organic solvent, having a low dielectric constant, or being curable to form a material having a low dielectric constant, (b) at least one organic solvent and (c) less than 1000 parts by weight of a polymeric coating additive per million parts by weight of total composition (ppm). The polymeric additive is characterized in that it is miscible with component (a) and the solvent system but becomes incompatible with the mixture of component (a) and solvent during the coating process.

37 Claims, No Drawings

SPIN-ON-DIELECTRIC COMPOSITIONS WITH COATING ENHANCER

CROSS REFERENCE TO RELATED APPLICATION

This application claims the benefit of provisional application 60/219,155, filed on Jul. 19, 2000, which is incorporated by reference in its entirety.

FIELD OF THE INVENTION

This invention relates to spin-on-dielectric compositions which have additives, which reduce striations and/or broaden the processing window and, especially, to polyarylene compositions, which include such additives and are useful in making microelectronic devices.

BACKGROUND OF THE INVENTION

Spin-on-dielectrics include organic polymeric materials, which may be spin coated to form very thin layers useful in microelectronics applications. See, e.g., CYCLOTENE™ benzocyclobutene based resins from The Dow Chemical Company; WO 97/10193; WO 98/11149 (disclosing polyarylenes) and EP 0 755 957 B1, Jun. 5, 1999; N. H. Hedricks and K. S. Y. Liu, *Polym. Prepr.* (Am. Chem. Soc., Div. Polym. Chm.), 1996, 37(1), pp. 150–151; also, J. S. Drage, et al., *Material Res. Soc., Symp. Proc.*, (1997), Volume 476, (Low Dielectric Constant Materials III), pp. 121–128 (disclosing polyarylene ethers). In many of these microelectronics applications, such as interlayer dielectric, passivation, etc., the coating quality and uniformity are very important.

Unfortunately, some compositions are extremely difficult to spin coat without experiencing coating defects, such as striations and cracking. Therefore, compositions are desired that can be coated with minimal defects and/or which have a broader processing window for spin speed and environmental conditions, such as temperature and humidity.

Various types of materials have been taught to generally facilitate coating. For example, resins, such as acrylics, ureas, melamines, cellulose acetobutyrates, and polyvinyl butyrals, at typical addition levels between 0.5 and 2.0 percent, have been taught to control surface flow. Silicones and fluorocarbons and other surfactants have also been taught to be useful. See *Handbook of Coating Additives*, Ch. 5, Leveling and Flow Control, by Horst Vltavsky, pp. 129–131, Ed. Leonard J. Calbo, Marcel Dekker Inc. (1987).

An article in *SPIE*, Vol. 631, Advances in Resist Technology and Processing III, (1986), *Surface Tension Effects in Microlithography—Striations* by B. Daniels, et al. mentions that for photoresists used in lithography as little as 0.005 percent of an unidentified surface leveling agent can eliminate striations in a Novolak diazoquinone resist but suffered from a negative cratering effect.

SUMMARY OF THE INVENTION

Applicants have discovered spin-on-dielectric formulations that have a broader processing window and limited or no observable striations with only very low levels of polymeric coating additives. Preferably, these additives are free or substantially free of silicon and fluorine as these materials are perceived as being detrimental in integrated circuit manufacture.

This invention is a composition comprising (a) an oligomer or polymer dispersible in an organic solvent, (b) at least one organic solvent and (c) less than 1000 parts by weight of a polymeric coating additive per million parts by weight of total composition (ppm). Component (a) is preferably present in amounts less than 40 percent, preferably less than 30 percent and more preferably less than 20 percent by weight based on total weight of the composition. This oligomer or polymer is preferably curable to form a cured polymer characterized by a dielectric constant less than 4.0, preferably less than 3.0. If said polymer is not curable, the dielectric constant of the polymer itself is less that 4.0, preferably less than 3.0. While a single organic solvent may be used, the solvent system preferably comprises at least a first and second solvent. The polymeric coating additive is preferably used in an amount less than 500 parts by weight, more preferably less than about 200 parts by weight per million parts by weight of the total composition.

The polymeric additive is characterized in that it is miscible with component (a) and the solvent system but becomes incompatible with the mixture of component (a) and solvent during the coating process. In other words, as the solvent is removed during the spin coating process, the additive will become incompatible with the remainder of the composition (i.e., component (a) and what remains of the solvent) and, therefore, will migrate to surface interfaces.

According to one preferred embodiment, the additive is characterized in that it has a total Hansen solubility parameter, $\delta_t$, that differs from, and is preferably less than, the solubility parameter of component (a) by at least 1 $MPa^{1/2}$. More preferably, the solubility parameter of component (c) differs from, and is most preferably less than, the solubility parameter of component (a) by at least 1.5 $MPa^{1/2}$. Note, however, that molecular weights of the polymeric components also have an effect and high molecular weight polymers require lower additive levels to be effective and/or may function with a smaller difference in solubility parameter. Note, also, that if the polymeric coating additive (c) is too soluble in the solvents, the incompatibility may not be sufficient to resolve the striation problem, even if the difference in solubility parameters between component (a) and (c) would seem to be sufficient.

Thus, according to a second preferred embodiment, the solvent system comprises at least a first solvent and a second solvent, wherein the first solvent has a higher vapor pressure than the second solvent (or stated alternatively, the first solvent has a lower boiling point than the second solvent) and the coating additive is characterized in that it is soluble in the first solvent but phase separates to form a substantially contiguous fluid phase in the second solvent.

According to a third preferred embodiment, the resin is selected from the group consisting of polybutene, polyisoprene, acrylate polymers and copolymers.

According to a fourth preferred embodiment, this invention is a method of spin coating the formulation of any of the previous formulations onto a substrate resulting in a film of the curable polymer or oligomer, which is free of striations.

This invention is also a process using the previous compositions to form a film of a polymer having a low dielectric constant, said film being substantially free of striations.

DETAILED DESCRIPTION OF THE INVENTION

The curable polymers or oligomers of this invention are materials, which when cured, form a polymer having dielectric constants of less than 4.0, preferably less than 3.0. Preferred materials are benzocyclobutene based polymers, such as CYCLOTENE™ 5021 from The Dow Chemical Company, the bisorthodiacetylene based polymers as disclosed, for example, in WO 97/10193. These polymers are made by the reaction of precursor compounds of the formula:

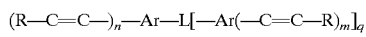

wherein each Ar is an aromatic group or inertly-substituted aromatic group and each Ar comprises at least one aromatic ring; each R is independently hydrogen, an alkyl, aryl or inertly-substituted alkyl or aryl group; L is a covalent bond or a group which links one Ar to at least one other Ar; preferably a substituted or unsubstituted alkyl group, n and m are integers of at least 2; and q is an integer of at least 1, and wherein at least two of the ethynylic groups on one of the aromatic rings are ortho to one another. Alternatively, polyarylenes as disclosed, for example, in WO 98/11149, and polyarylene ethers, such as, for example, PAE resins— Air Products, are described in EP 0 755 957 B1, Jun. 5, 1999 and/or the FLARE™ resins made by Honeywell International, Inc. (see N. H. Hedricks and K. S. Y. Liu, *Polym. Prepr.* (Am. Chem. Soc., Div. Polym. Chm.), 1996, 37(1), pp. 150–151; also J. S. Drage, et al., *Material Res. Soc., Symp. Proc.*, (1997), Volume 476 (Low Dielectric Constant Materials III), pp. 121–128 may be used. Thermosetting materials are especially desirable for interlayer dielectric applications.

Preferably, the oligomers and polymers and corresponding starting monomers of the present invention are:

I. Oligomers and polymers of the general formula:

wherein A has the structure:

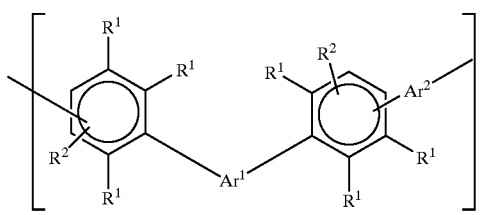

and B has the structure:

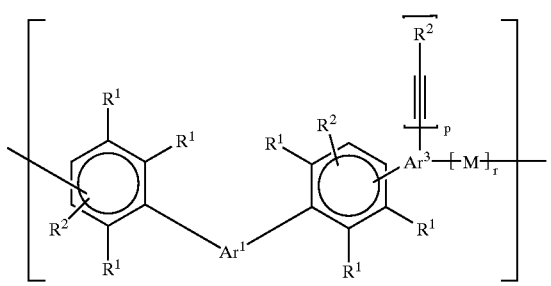

wherein EG are end groups having one or more of the structures:

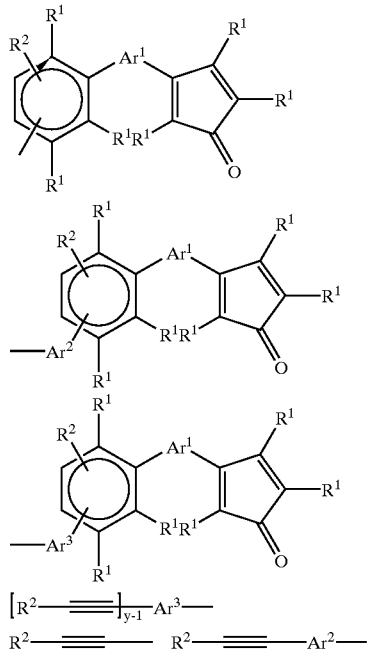

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety, M is a bond, and y is an integer of three or more, p is the number of unreacted acetylene groups in the given mer unit, r is one less than the number of reacted acetylene groups in the given mer unit and p+r=y−1, z is an integer from 1 to 1000, w is an integer from 0 to 1000 and v is an integer of two or more.

Such oligomers and polymers can be prepared by reacting a biscyclopentadienone, an aromatic acetylene containing three or more acetylene moieties and, optionally, a polyfunctional compound containing two aromatic acetylene moieties. Such a reaction may be represented by the reaction of compounds of the formulas (a) a biscyclopentadienone of the formula:

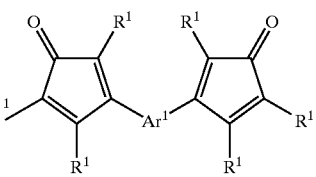

(b) a polyfunctional acetylene of the formula:

(c) and, optionally, a diacetylene of the formula:

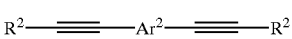

wherein $R^1$, $R^2$, $Ar^1$, $Ar^2$, $A^3$ and y are as previously defined.

The definition of aromatic moiety includes phenyl, polyaromatic and fused aromatic moieties. Inertly-substituted means the substituent groups are essentially inert to the cyclopentadienone and acetylene polymerization reactions and do not readily react under the conditions of use of the cured polymer in microelectronic devices with environmental species, such as water. Such substituent groups include, for example, F, Cl, Br, —CF$_3$, —OCH$_3$, —OCF$_3$, —O—Ph and alkyl of from one to eight carbon atoms and cycloalkyl of from three to eight carbon atoms. For example, the moieties which can be unsubstituted or inertly-substituted aromatic moieties include:

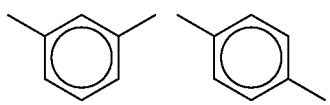

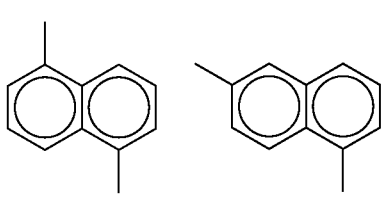

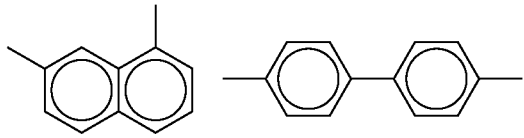

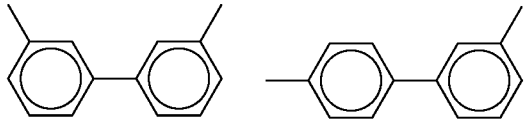

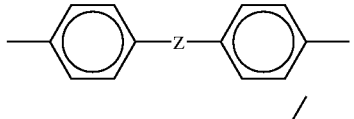

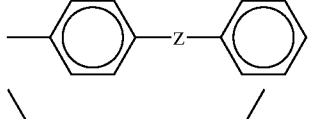

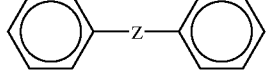

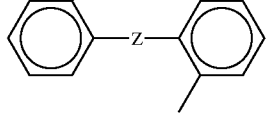

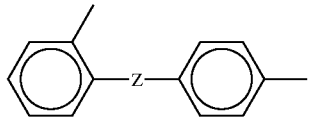

-continued

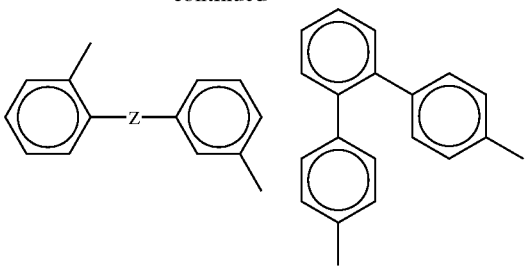

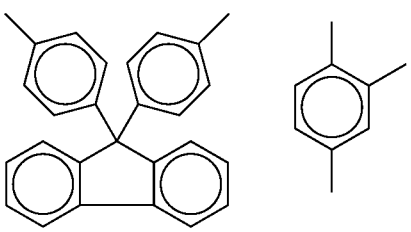

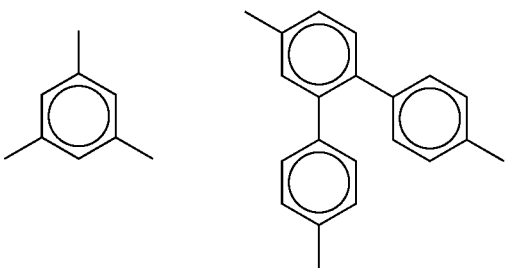

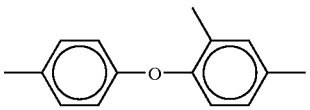

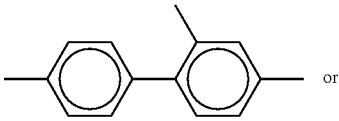

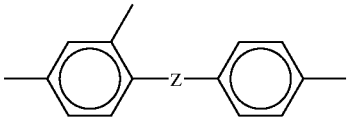

wherein Z can be: —O—, —S—, alkylene, —CF$_2$—, —CH$_2$—, —O—CF$_2$—, perfluoroalkyl, perfluoroalkoxy,

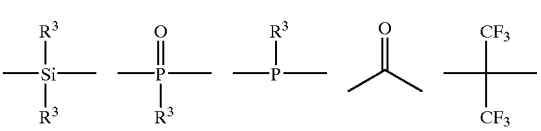

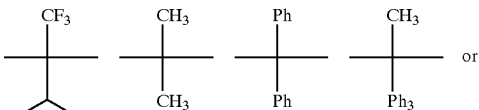

or

-continued

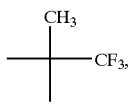

wherein each R³ is independently —H, —CH$_3$, —CH$_2$CH$_3$, —(CH$_2$)$_2$CH$_3$ or Ph. Ph is phenyl.

The amount of the curable polymer or oligomer is preferably less than about 40, more preferably less than 30, and most preferably less than about 20 weight percent based on total weight of the polymer (or oligomer) and the solvent system, but greater than 1, more preferably greater than 5 weight percent.

The solvent system comprises at least one, preferably at least two, most preferably two, organic solvents. Examples of such solvents include mesitylene, pyridine, triethylamine, N-methylpyrrolidinone (NMP), methyl benzoate, ethyl benzoate, butyl benzoate, cyclopentanone, cyclohexanone, cycloheptanone, cyclooctanone, cyclohexylpyrrolidinone and ethers or hydroxy ethers (such as dibenzylethers, diglyme, triglyme, diethylene glycol ethyl ether, diethylene glycol methyl ether, dipropylene glycol methyl ether, dipropylene glycol dimethyl ether, propylene glycol phenyl ether, propylene glycol methyl ether, tripropylene glycol methyl ether), toluene, xylene, benzene, dipropylene glycol monomethyl ether acetate, dichlorobenzene, propylene carbonate, naphthalene, diphenyl ether, butyrolactone, dimethylacetamide, dimethylformamide and mixtures thereof. The preferred solvents are mesitylene, N-methylpyrrolidinone (NMP), gamma-butyrolactone, diphenylether, cyclohexanone or mixtures of two or more of the preceding.

The polymeric coating additive is selected based on its compatibility with component (a) and the organic solvent system. The additive must be miscible with such other components during storage and during initial dispense of the composition for coating but should become incompatible with the other components as the coating process continues, i.e., as solvent is removed during spinning and/or during any heating for solvent removal. The incompatibility can be determined, in part, by comparing the total Hansen solubility parameters of the additive and component (a). The total Hansen solubility parameter may be determined by observing the solubility data according to the following codes: 1=soluble, 2=almost soluble, 3=strongly swollen, 4=swollen, 5=slightly swollen and 6=insoluble. This data is for the material in a series of 20 to 30 solvents having known parameters. A non-linear least squares procedure is then used to estimate the Hansen solubility parameters and the radius of the solubility envelope around that resin. The total Hansen solubility parameter, $\delta_t$, may then be calculated as $\delta_t^2 = \delta_d^2 + \delta_p^2 + \delta_h^2$, where $\delta_d$ is the dispersion parameter, $\delta_p$ is the polar parameter and $\delta^h$ is the h-bonding parameter. For further explanation of Hansen solubility parameters see, e.g., *Hansen Solubility Parameter: A User's Handbook*, Charles M. Hansen, CRC Press LLC, Boca Raton, Fla., 2000. The difference between the total solubility parameter of component (a) and the polymeric additive is preferably at least 1 MPa$^{1/2}$, more preferably at least 1.5 MPa$^{1/2}$. Preferably, the solubility parameter of the polymeric additive is at least 1, more preferably at least 1.5, MPa$^{1/2}$ less than that for component (a). For the preferred component (a), which is the reaction product of cyclopentadienone functional compounds and acetylene functional compounds, as recited above, the additive preferably has a to al Hansen solubility parameter of less than about 20 MPa$^{1/2}$, more preferably less than about 19 MPa$^{1/2}$. This preferred component (a) has a total Hansen solubility parameter of about 22.7 at very low degrees of polymerization (degree of polymerization of about 1), which then decreases gradually to about 21.07 at higher degrees of polymerization (Mn of about 8000–9000).

Molecular weight effects of both component (a) and the polymeric coating additive can also have a substantial effect, in that higher molecular weight materials will have more incompatibility. Therefore, if higher molecular weight materials are used for either or both of component (a) and the polymeric coating additive, the coating additive may be effective with a smaller difference in solubility parameter and/or may be effective at lower amounts.

The solubility of the additive in the solvent system will also have an impact on its effectiveness. If an additive is too soluble in the solvent, it may fail to be an effective coating additive, even if its solubility parameter when compared with that for component (a) would seem to indicate that it would be an effective additive. Thus, according to another preferred embodiment, the solvent system comprises at least two organic solvents having different characteristic vapor pressures. The polymeric coating additive, which provides improved coating characteristics, is soluble in the solvent having the higher vapor pressure (i.e., the solvent that evaporates first during coating), preferably at concentrations of at least 1 weight percent, more preferably at concentrations of at least 5 weight percent, most preferably at concentrations of at least 20 weight percent. However, the polymeric coating additive is somewhat insoluble in the solvent having the higher vapor pressure. "Somewhat insoluble" means that when the polymeric additive is mixed with the second solvent it forms a substantially contiguous second fluid phase. Preferably, this substantially contiguous second fluid phase occurs at concentrations of additive of less than 1 weight percent in the solvent, more preferably at less than about 0.3 weight percent. "Substantially contiguous" means that large second phase domains are formed rather than many dispersed droplets in the larger phase.

Examples of suitable polymeric additives include polyisoprenes, polybutenes, polybutadiene, hydrogenated polystyrenes, hydrogenated polystyrene/indene resins, poly (styrene-b-ethylene-co-propylene) and acrylate polymers and copolymers. Polybutenes, preferably, have a number average molecular weight greater than about 500 and less than about 10,000. Polyisoprenes, preferably, have a weight average molecular weight of greater than about 1000 and, preferably, less than about 15,000. Suitable acrylate polymers include ethylacrylates, butylacrylate, ethylacrylate/ ethylhexylacrylate copolymers, butylacrylate/ethyl hexyl acrylate copolymers and the like. These acrylate materials are commerically available under the trademark BYK™ from Byk Chemie or MODAFLOW™ from Solutia, Inc.

The polymeric coating additive is effective in surprisingly low amounts. The most effective amount will depend on the solubility parameter of component (a) relative to the polymeric coating additive, the molecular weights of component (a) and the polymeric additive, the particular solvent system used and the additive's compatibility with those solvents. However, the amount is less than 2000 ppm, preferably less than 1000 ppm, more preferably less than 200 ppm, more preferably still less than 100 ppm, and most preferably less than 50 ppm. Preferably, the additive is present in amounts of at least 0.5 ppm, more preferably at least 1 ppm, and most preferably at least 5 ppm. For the preferred polyarylene oligomer having number average molecular weights of more than about 6000 (preferably in a solution of gamma-butyrolactone and cyclohexanone), the additive is preferably selected from acrylate polymers and copolymers, polyisoprene and polybutene and is preferably present in amounts of 1 to 100, more preferably 1–50, and most preferably 2–40 ppm. For a similar oligomer but lower molecular weight oligomer (Mn<about 5500 preferably in a solution of gamma-butyrolactone and mesitylene), the additive is preferably present in higher amounts of up to about 500 ppm, preferably 10 to 300 ppm, more preferably at least about 40 ppm to about 150 ppm. Applicants speculate that the higher amount is probably required due to both the lower molecular weight of the oligomer, although the change in solvent may also have an effect.

Spin conditions and environmental conditions (such as temperature and humidity) will also have an effect on the amount of coating aid that is optimal. Note also, that if too much of component (c) is added, coating defects other than striations, such as cracking, will become a problem.

Preferably, the polymeric additive is such that it degrades and is pyrolyzed during the process of manufacture of the electronic devices. This is preferred so that the polymeric additive will not effect the material properties of the final film.

According to yet another embodiment, this invention is a method of forming a layer comprising predominantly component (a) via spin coating. The method comprises applying the composition of the first embodiment to a substrate and spinning the substrate at speeds of from about 500 to 4500, preferably 1000 to 4000, rotations per minute to form a layer that has no observable striations under magnifications of 100×. Preferably, the method also comprises heating the coated substrate to remove any residual solvent and/or cure a thermosetting component (a).

EXAMPLES

Comparative Example 1

Preparation and Spinning of Oligomer Solution from 3,3'-(oxydi-1,4-phenylene) bis(2,4,5-triphenylcyclopentadienone) and 1,3,5-tris (phenylethynyl)benzene High purity 3,3'-(oxydi-1,4-phenylene)bis(2,4,5-triphenylcyclopentadienone) (1111 grams), 488.8 grams of 1,3,5-tris(phenylethynyl)benzene and 3500 grams of electronic grade gamma-butyrolactone was added to a 5-L flask. The flask was attached to a nitrogen/vacuum inlet. The magnetically stirred solution was degassed by applying vacuum and refilling with nitrogen five times. Nitrogen gas was then allowed to flow through the headspace of the flask and exit through a mineral oil bubbler. The solution was then heated to an internal temperature of 200° C. After 48 hours of heating, the solution was cooled to room temperature and diluted with 2500 grams of cyclohexanone and then transferred into a bottle (to be referred to as "b-stage concentrate" hereafter). Analysis of the final solution by gel permeation chromatography indicated a $M_n$=8875 relative to a polystyrene standard. This oligomer has a total Hansen solubility parameter of about 21.1 $MPa^{1/2}$. Prior to wafer coating, a portion of the b-stage concentrate was diluted with additional electronic grade cyclohexanone to a solids content of approximately 13 percent.

Approximately 3 mL of the polyphenylene solution prepared above was applied onto an 8-inch silicon wafer surface at 60 rpm. Immediately after dispensing the oligomer solution, the wafer was accelerated at 10000 rpm/sec to 1800 rpm and dried for 45 seconds. A continuous stream of mesitylene was applied to the backside of the wafer for 5 seconds during the application of the oligomer solution. The 2 mm to 5 mm edge bead of the coating was then removed with a continuous stream of mesitylene while the wafer was spun at 750 rpm, either by application from the backside or directly from the top near the edge. After the edge bead removal, the oligomer was further polymerized on a hot plate at 320° C. for 60 seconds under a nitrogen blanket. After hot plate baking, the wafer was evaluated for defects using an optical microscope. Striations were observed in the coating. Striations were rated based on the magnitude of the striations in the coating using a 0–4 scale as indicated in Table 1. The striation rating was 4.

TABLE I

| Rating | Striations |
| --- | --- |
| 0 | None observed under 100X |
| 2 | Striations extend from the center to approximately ½ of the radius of the wafer |
| 4 | Striations extend from the center to the perimeter of the wafer |

Example 2

Polyisoprene Additive

B-stage concentrate (30.37 grams), similar to that made in Example 1, was diluted with 16.29 grams of cyclohexanone. Approximately 0.01 gram of polyisoprene with a molecular weight (Mw) of 8090 was added to this solution. The resulting polyisoprene concentration was 214 ppm. Approximately 3 mL of solution was applied to an 8-inch silicon wafer as described in Comparative Example 1. After hot plate baking, the wafer was evaluated for defects using an optical microscope. Polyisoprene has a total Hansen solubility parameter of about 20.1. No striations were observed (striation rating=0).

Example 3

Polyisoprene Additive

B-stage concentrate similar to that described in Comparative Example 1 was diluted with cyclohexanone to a solids content of approximately 13 percent. Sufficient quantities of the polyisoprene-doped polyphenylene solution, described in Example 2, were added to samples of this solution to produce solutions containing 100 ppm, 10 ppm, 7 ppm, 5 ppm and 1 ppm of polyisoprene. These solutions were applied to 8-inch silicon wafer surfaces and the coatings evaluated, as described in Comparative Example 1. The coatings made with 7, 10 and 100 ppm of polyisoprene were striation free (striation rating=0), while those made with 5 ppm and 1 ppm had striation ratings of <1 and 2.5, respectively.

Example 4

Effect of Polyisoprene Molecular Weight

A series of polyisoprene-doped cyclohexanone solutions were prepared by adding approximately 0.1 gram of polyisoprene of known molecular weight to 99.9 grams of cyclohexanone. A series of polyisoprene-doped polyphenylene solutions were then prepared from these cyclohexanone solutions by diluting a b-staged concentrate similar to that described in Comparative Example 1, with sufficient cyclohexanone plus doped-cyclohexanone, to give solids loading of approximately 13 weight percent and polyisoprene levels of about 10–140 ppm. These solutions were applied to 8-inch wafer surfaces and the coatings evaluated, as described in Comparative Example 1. Table II describes the polyisoprene contents and striation rating of these wafers.

TABLE II

| Polyisoprene Molecular Weight (Mw) | Polyisoprene Concentration ppm | Striation Rating | Observations |
|---|---|---|---|
| 1020 | 136 | 1.5 | — |
| 1020 | 26 | 3 | — |
| 1020 | 10 | 3.5 | — |
| 2660 | 103 | 0 | — |
| 2660 | 28 | 1.5 | — |
| 2660 | 13 | 2.5 | — |
| 4000 | 136 | 0 | — |
| 4000 | 25 | 0 | — |
| 4000 | 10 | 0 | — |
| 4600* | 100 | 0 | Cracks |
| 4600* | 29 | 0 | — |
| 4600* | 10 | 0 | — |
| 9870 | 99 | 0 | Cracks, particles, bubbles and non-uniform coating |
| 9870 | 25 | 0 | Cracks, particles, bubbles and non-uniform coating |
| 9870 | 12 | 0 | Cracks, particles, bubbles and non-uniform coating |
| 14600 | 106 | 0 | Cracks, particles, bubbles and non-uniform coating |
| 14600 | 27 | 0 | Cracks, particles, bubbles and non-uniform coating |
| 14600 | 11 | 0 | Cracks, particles, bubbles and non-uniform coating |

*The solubility of this 4600 Mw polyisoprene in cyclohexanone (CHO) and gamma-butyrolactone (GBL) was tested by adding varying amounts of polyisoprene to separate vials, each containing one of the solvents and shaking the combination overnight. In cyclohexanone, the polyisoprene was still soluble at 19 weight percent, at which time the testing ceased. In gamma-butyrolactone, the polyisoprene was tested to concentrations as low as 0.3 weight percent and was found to form a second fluid phase. Lower concentrations in gamma-butyrolactone were not tested.

Example 5

Polystyrene Additive

A doped-cyclohexanone solution was prepared as described in Example 4, except that polystyrene having a molecular weight of 2800 (Mw) was used as the dopant. A series of polystyrene-doped polyphenylene solutions were made from these solutions, as described in Example 4, having polystyrene concentrations of 96 ppm, 25 ppm and 10 ppm. These solutions were applied to 8-inch wafer surfaces and the coatings evaluated as described in Comparative Example 1. All coatings were striated with striation ratings of 3–3.5. This polystyrene was still soluble in GBL at concentrations of 1 weight percent and in cyclohexanone at concentrations of 6.7 weight percent. The high solubility of polystyrene in the solvents is believed to explain why this was a relatively ineffective additive despite having a total Hansen solubility parameter of about 19.2.

Example 6

Polyisoprene Additive

A polyisoprene doped-cyclohexanone solution containing 1540 ppm of a 4000 molecular weight polyisoprene was prepared as described in Example 4 and used to prepare an 18 weight percent solids polyphenylene solution, as described in Example 4. The polypheneylene solution contained 11 ppm polyisoprene. This solution was applied to an 8-inch silicon wafer and the coating was evaluated, as described in Comparative Example 1. No striations were observed (striation rating=0).

Example 7

Polybutene Additive

A series of doped cyclohexanone solutions were prepared as described in Example 4, except polybutene was used instead of polyisoprene. A series of polybutene-doped polyphenylene solutions were prepared from these cyclohexanone solutions by diluting a b-staged concentrate similar to that described in Comparative Example 1, with sufficient cyclohexanone plus doped-cyclohexanone to give solids loading of approximately 13 weight percent and polybutene levels of 10–140 ppm. The solutions were filtered through a 0.45 micron filter. The filtered solutions were applied to 8-inch wafer surfaces and the coatings evaluated, as described in Comparative Example 1. The temperature and humidity during coating were 21.5° C. and 39 percent relative humidity. Table III describes the polyisoprene contents and striation rating of these wafers.

TABLE III

| Polybutene Molecular Weight (Mn) | Polybutene Concentration (ppm) | Striation Rating (filtered solutions) |
|---|---|---|
| 2300 | 114 | 0 |
| 2300 | 10 | 0 |
| 750* | 103 | 0 |
| 750* | 12 | 0 |
| 560 | 140 | 0 |
| 560 | 10 | 0 |
| 320** | 101 | 1 |
| 320** | 11 | 4 |

TABLE III-continued

| Polybutene Molecular Weight (Mn) | Polybutene Concentration (ppm) | Striation Rating (filtered solutions) |
|---|---|---|

*750 Mn polybutene was tested for solubility as described in Example 4. It was still soluble in cyclohexanone at concentrations of 19 weight percent (higher concentrations not tested), but formed a second contiguous phase at 0.3 weight percent in gamma-butyrolactone (lower concentrations not tested).
**320 Mn polybutene was tested for solubility as described in Example 4. It was still soluble in cyclohexanone at concentrations of 20 weight percent (higher concentrations not tested), but formed a second contiguous phase at 0.23 weight percent in gamma-butyrolactone (lower concentrations not tested).

Example 8

Polybutene Additive

A doped cyclohexanone solution was prepared, as described in Example 4, except that polybutene with a molecular weight (Mn) of 560 was used instead of polyisoprene. The polybutene concentration in the solution was 3605 ppm. A series of polybutene-doped polyphenylene solutions was prepared from this cyclohexanone solution by diluting a b-staged concentrate similar to that described in Comparative Example 1, with sufficient cyclohexanone plus doped-cyclohexanone, to give polyphenylene loadings between 10–16 percent and polybutene levels between about 0 and 80 ppm. These solutions were filtered through a 0.45 micron filter. The filtered solutions were applied to 8-inch wafer surfaces and the coatings evaluated, as described in Comparative Example 1. The temperature and humidity during coating were 19° C. and 41 percent relative humidity. Table IV gives the polyphenylene and polybutene contents and the striation rating of these wafers.

TABLE IV

| Polyphenylene Content, wt % | Polybutene Content, ppm | Striation Rating |
|---|---|---|
| 16 | 0 | 4 |
| 16 | 26 | 0.5 |
| 16 | 55 | 0 |
| 16 | 77 | 0 |
| 13 | 0 | 4 |
| 13 | 26 | 0.25 |
| 13 | 51 | 0 |
| 13 | 78 | 0 |
| 10 | 0 | 1 |
| 10 | 25 | 0.1 |
| 10 | 53 | 0 |
| 10 | 78 | 0 |

Example 9

Acrylate Copolymer Additive

A B-staged concentrate, made by a process similar to that in Example 1, was diluted with electronics grade cyclohexanone to a 13 weight percent resin formulation. Approximately 0.0136 gram of MODAFLOW™ ethyl-acrylate/2-ethylhexyl acrylate copolymer from Solutia, Inc. was added to approximately 20 grams of the 13 weight percent resin formulation, previously described. The resulting copolymer concentration in the formulation was approximately 0.068 weight percent (680 ppm) based on total formulation weight. Approximately 5 mLs of the formulated solution was dispensed onto a six-inch silicon wafer at 50 rpm for 5 seconds. The speed was immediately acceleratd at 10,000 rpm/second to a final speed of 2400 rpm and spun dry for 30 seconds. The wafer was then baked on a hotplate at 320° C. for 90 seconds. After the hotplate bake, the wafer was inspected for defects using an optical microscope. No striations were observed in the film (striation rating=0).

The solubility of this additive was tested as in Example 4. It was still soluble at 19 weight percent concentrations in cyclohexanone and formed a contiguous second phase after shaking overnight at 0.23 weight percent in gamma-butyrolactone. Lower concentrations were not tested. The Hansen solubility parameter for this additive is about 18.8.

Example 10

Acrylate Copolymer Additive

A b-staged concentrate, made by a process similar to that in Example 1, was diluted with electronics grade cyclohexanone to a 13 weight percent resin formulation. Approximately 0.001 gram of MODAFLOW ethyl-acrylate/2-ethylhexyl acrylate copolymer was added to approximately 20 grams of the 13 weight percent resin formulation described in Example 9. The resulting copolymer concentration in the formulation was approximately 0.005 weight percent (50 ppm) based on total formulation weight. The sample was processed and inspected as described in Example I. No striations were observed in the film (striation rating=0).

Example 11

Ethyl-Acrylate/Ethylhexyl Acrylate Copolymer

A doped-cyclohexanone solution was prepared as described in Example 4, except that MODAFLOW ethyl-acrylate/ethylhexyl acrylate copolymer was used instead of polyisoprene. The dopant concentration in the solution was 1100 ppm. A series of acrylate-doped polyphenylene solutions was prepared from this cyclohexanone solution by diluting a b-staged concentrate similar to that described in Comparative Example 1, with sufficient cyclohexanone plus doped-cyclohexanone to give solids loadings between 8–16 percent and acrylate levels between 0–20 ppm. The solutions were applied to 8-inch wafer surfaces and the coatings evaluated as described in Comparative Example 1. Table V gives the polyphenylene and acrylate contents and the striation rating of these wafers.

TABLE V

| Polyphenylene Content, wt % | Ethyl-Acrylate/ Ethylhexyl Acrylate Content, ppm | Striation Rating |
|---|---|---|
| 10 | 0 | 0.5 |
| 10 | 2 | 0 |
| 10 | 5 | 0 |
| 10 | 10 | 0 |
| 10 | 20 | 0 |
| 13 | 0 | 3 |
| 13 | 2 | 2.5 |

TABLE V-continued

| Polyphenylene Content, wt % | Ethyl-Acrylate/ Ethylhexyl Acrylate Content, ppm | Striation Rating |
|---|---|---|
| 13 | 4 | 0 |
| 13 | 10 | 0 |
| 13 | 10 | 0 |
| 16 | 0 | 3 |
| 16 | 1 | 2.75 |
| 16 | 4 | 0 |
| 16 | 10 | 0 |
| 16 | 20 | 0 |

Example 12

Butyl-Acrylate/Ethylhexyl Acrylate Copolymer Additive

A doped-cyclohexanone solution was prepared as described in Example 4, except that a BYK361 butylacrylate/ethylhexyl acrylate copolymer was used instead of polyisoprene. The dopant concentration in the solution was 10 percent. A series of acrylate-doped polyphenylene solutions was prepared from this cyclohexanone solution by diluting a b-staged concentrate similar to that described in Comparative Example 1, with sufficient cyclohexanone plus doped-cyclohexanone to give a solids loading of 13 weight percent and acrylate levels between 0–500 ppm. The solutions were applied to 6-inch wafer surfaces and the coatings evaluated as described in Comparative Example 1. table VI gives the acrylate contents and the striation rating of these wafers.

TABLE VI

| Butyl-Acrylate/ Ethylhexyl Acrylate Content, ppm | Striation Rating |
|---|---|
| 0 | 4 |
| 500 | 0 |
| 250 | 0 |
| 100 | 0 |
| 50 | 0 |
| 10 | 0 |
| 5 | 0 |
| 1 | 0 |
| 0.5 | <0.5 |

The solubility of this additive was tested as in Example 4. It was still soluble at 19 weight percent in cyclohexanone but formed a second contiguous phase in gamma-butyrolactone at 0.3 weight percent. Lower concentrations in gamma-butyrolactone were not tested. The Hansen solubility parameter for this additive is about 19.4.

Comparative Example 13

Polyether Modified Poly-Dimethyl Siloxane (BYK 346)

A b-staged concentrate made by the process similar to that described in Comparative Example 1 was diluted with cyclohexanone to a solids content of 13 weight percent. Approximately 0.0239 gram polyether modified poly-dimethyl siloxane was added to 20 grams of this formulation to give a dopant level of 1195 ppm. This solution was applied to a 6-inch wafer surface and the coating evaluated, as described in Comparative Example 1. No striations were observed in the film (striation rating=0).

Comparative Example 14

Mineral Oil

Doped cyclohexanone was prepared as described in Example 4, except that 1204 ppm of mineral oil (approximately 400 molecular weight) was used as the dopant. A series of mineral oil doped-polyphenylene solutions were prepared from this mineral oil doped-cylohexanone to give solids loadings of approximately 13 weight percent and mineral oil levels of 1–100 ppm. These solutions were applied to 8-inch wafer surfaces and the coatings evaluated as described in Comparative Example 1. Table VII describes the mineral oil contents and the striation rating of these wafers.

TABLE VII

| Mineral Oil Molecular Weight (Mn) | Mineral Oil Concentration ppm | Striation Rating |
|---|---|---|
| 400 | 129 | 2.5 |
| 400 | 10 | 3.5 |

While this additive formed a second phase in GBL at concentrations of less than 0.3 weight percent, the second phase was dispersed in droplets rather than a contiguous second phase. The total Hansen solubility parameter for this additive is about 20.3

Example 15

A second type of b-stage concentrate may be made by adding high purity 3,3'-(oxydi-1,4-phenylene)bis(2,4,5-triphenylcyclopentadienone) (970.2 grams (1.24 mol)), 469.0 grams (1.24 mol) of 1,3,5-tris(phenylethynyl)benzene and 2160.5 grams of electronic grade gamma-butyrolactone to a 5-L flask. The flask was attached to a nitrogen/vacuum inlet. The magnetically stirred solution was degassed by applying vacuum and refilling with nitrogen five times. Nitrogen gas was then allowed to flow through the headspace of the flask and exit through a mineral oil bubbler. The solution was then heated to an internal temperature of 200° C. After 14 hours of heating, the solution was cooled to room temperature and diluted with 1199.3 grams of mesitylene and then transferred into a bottle. Analysis of the final solution by gel permeation chromatography indicated a $M_n$=4600 relative to a polystyrene standard. A solution made using a b-stage concentrate similar to the preceding was diluted with mesitylene to a concentration of 18 weight percent resin.

Approximately 0.010 gram of MODAFLOW ethyl-acrylate/2-ethylhexyl acrylate copolymer was added to approximately 20 grams of the 18 weight percent resin formulation, previously described. The resulting copolymer concentration in the formulation was approximately 0.05 weight percent (500 ppm) based on total formulation weight. The sample was processed and inspected as described in Example 9. No striations were observed in the film (striation rating=0).

This additive is still soluble in mesitylene at concentrations of 1 weight percent and higher.

Example 16

A b-staged concentrate, made by a process similar to that in Example 15, was diluted with electronics grade mesitylene to an 18 weight percent resin formulation. Approximately 0.0010 gram of MODAFLOW ethyl-acrylate/2-ethylhexyl acrylate copolymer was added to approximately 20 grams of the 18 weight percent resin formulation, previously described. The resulting copolymer concentration in the formulation was approximately 0.005 weight percent (50 ppm) based on total formulation weight. The sample was processed and inspected as described in Example 9. No striations were observed in the film (striation rating=0).

Example 17

A b-staged concentrate made by a process similar to that in Example 15 was diluted with electronics grade mesitylene to an 18 weight percent resin formulation. Approximately 0.002 gram of BYK 358 polyacrylate copolymer was added to approximately 20 grams of the 18 weight percent solids solution described in Example 9. The resulting copolymer concentration in the formulation was approximately 0.010 weight percent (100 ppm) based on total formulation weight. The sample was processed and inspected as described in Example 1. No striations were observed in the film (striation rating=0).

Comparative Example 18

Polyglycol

Doped-cyclohexanone was prepared as described in Example 4, except that 2729 ppm of polyglycol of molecular weight 400 (Mw) was used as the dopant. Polyglycol doped-polyphenylene solutions were prepared from this polygylcol doped-cyclohexanone to give solids loadings of approximately 13 weight percent and polyglycol levels of 11 and 107 ppm. These solutions were applied to 8 inch wafer surfaces and the coatings evaluated as described in Comparative Example 1. Both the 11 ppm and 107 ppm polyglycol doped polyphenylene films had striation ratings of 4. This additive has a total Hansen solubility parameter of about 21 and is still soluble in GBL at concentrations of 5 weight percent.

Comparative Example 19

Fluorinated Surfactants

A b-staged concentrate similar to that in Example 1 was diluted with cyclohexanone and was doped with a fluorine based surfactant FC170-C from Minnesota Mining and Manufacturing Company. The results showed that while striations were eliminated other coating defects occurred.

| Level ppm | Striation | Comments |
|---|---|---|
| 10 | 0 | "Stain" |
| 100 | 0 | Cracks, "stain" |

Example 20

Approximately 40 grams of oligomer was precipitated from a b-staged solution similar to that described in Comparative Example 1 and dried to remove residual solvent. The precipitate was mixed with sufficient cyclohexanone to give 19.3 percent solids solution in cyclohexanone. About 20 grams of this solution was mixed with 0.45 gram cyclohexanone doped with MODAFLOW resin at 1375 ppm and another 9.6 grams of cyclohexanone to give a solids content of about 13 percent and a MODAFLOW level of about 20 ppm. When spin coated, no striations were observed in the resulting film (striation rating=0). Another 20 grams of the 19.3 percent solution was diluted with cyclohexanone only to a concentration of about 13 percent. This undoped solution yielded a highly striated film when spin coated (striation rating=4).

What is claimed is:

1. A composition suitable for coating to form thin films comprising:

(a) less than 40 percent by weight based on total weight of the composition of a polymer or oligomer, which is soluble or dispersible in organic solvents, said polymer or oligomer is characterized in that it has a dielectric constant less than 4.0 or it is curable to form a cured polymer having a dielectric constant less than 4.0;

(b) a solvent system, comprising at least one organic solvent and (c) a polymeric coating additive in amounts less than about 1000 parts by weight based on one million parts of the total composition, wherein the coating additive is dispersed in the solution but is characterized by incompatibility as solvent is removed during coating.

2. The composition of claim 1 wherein component (a) and the polymeric coating additive each have a total Hansen solubility parameter that differ by at least 1 $MPa^{1/2}$.

3. The composition of claim 2 wherein the total Hansen solubility parameter for the polymeric coating additive is at least 1 $MPa^{1/2}$ less than the total Hansen solubility parameter for component (a).

4. The composition of claim 2 wherein the polymeric coating additive has a total Hansen solubility parameter at least 1.5 $MPa^{1/2}$ less than the total Hansen solubility parameter of component (a).

5. The composition of claim 1 wherein the component (a) is a thermosetting oligomer which is the reaction product of:

(i) a biscyclopentadienone of the formula:

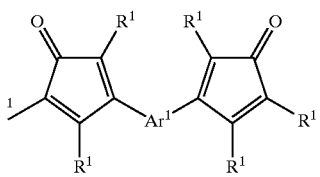

(ii) a polyfunctional acetylene of the formula:

(iii) and, optionally, a diacetylene of the formula:

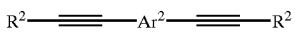

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety and y is an integer of three or more.

6. The composition of claim 1 wherein component (a) has the general formula:

wherein A has the structure:

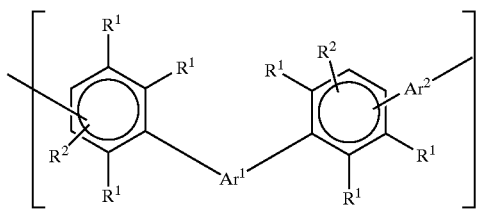

and B has the structure:

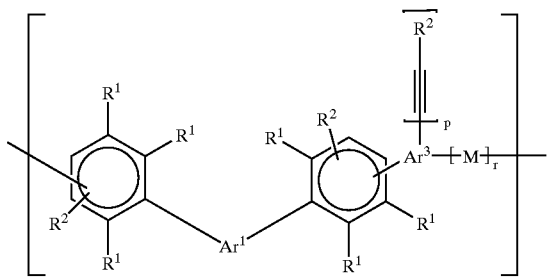

wherein EG are end groups having one or more of the structures:

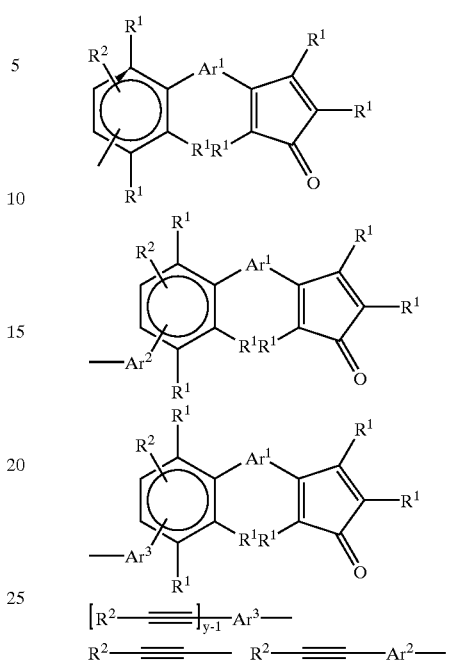

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety, M is a bond, and y is an integer of three or more, p is the number of unreacted acetylene groups in the given mer unit, r is one less than the number of reacted acetylene groups in the given mer unit and p+r=y−1, z is an integer from 1 to 1000; w is an integer from 0 to 1000 and v is an integer of two or more.

7. The composition of claim 5 wherein the total Hansen solubility parameter of the polymeric coating additive is less than 20.1 MPa$^{1/2}$.

8. The composition of claim 6 wherein the total Hansen solubility parameter of the polymeric coating additive is less than 20.1 MPa$^{1/2}$.

9. The composition of claim 5 wherein the polymeric coating additive is present in an amount from 0.5 to about 200 ppm.

10. The composition of claim 5 wherein the polymeric coating additive is present in an amount of about 1 to 50 ppm.

11. The composition of claim 1 wherein the solvent system comprises at least a first solvent and a second solvent, wherein the first solvent has a higher vapor pressure than the second solvent and wherein the coating additive is soluble in the first solvent but phase separates to form a substantially contiguous fluid phase in the second solvent.

12. The composition of claim 11 wherein the component (a) is a thermosetting oligomer which is the reaction product of (i) a biscyclopentadienone of the formula:

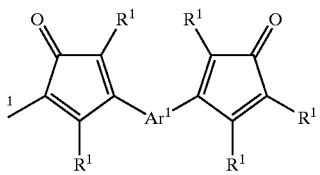

(ii) a polyfunctional acetylene of the formula:

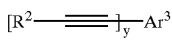

(iii) and, optionally, a diacetylene of the formula:

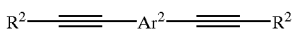

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety, and y is an integer of three or more.

13. The composition of claim 12 wherein the first solvent is selected from mesitylene and cyclohexanone and the second solvent is gamma-butyrolactone.

14. The composition of claim 11 wherein the polymeric coating additive is present in an amount from 0.5 to about 200 ppm.

15. The composition of claim 11 wherein the polymeric coating additive is present in an amount from about 1 to about 50 ppm.

16. A composition suitable for coating to form thin films comprising:

(a) less than 40 percent by weight based on total weight of the composition of a polymer or oligomer which is soluble or dispersible in organic solvents, said polymer or oligomer is characterized in that it has a dielectric constant less than 4.0 or it is curable to form a cured polymer having a dielectric constant less than 4.0;

(b) a solvent system having at least a first solvent and a second solvent, wherein the first solvent has a higher vapor pressure than the second solvent and (c) a polymeric coating additive in amounts less than about 1000 parts by weight per one million parts by weight of total composition, wherein the coating additive is soluble in the first solvent but phase separates to form a substantially contiguous fluid phase in the second solvent.

17. The composition of claim 16 wherein component (a) is a thermosetting oligomer which is the reaction product of (i) a biscyclopentadienone of the formula:

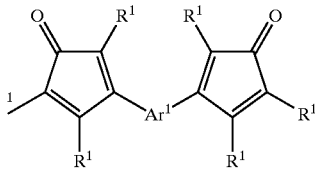

(ii) a polyfunctional acetylene of the formula:

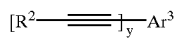

(iii) and, optionally, a diacetylene of the formula:

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety and y is an integer of three or more.

18. The composition of claim 17 wherein the first solvent is selected from mesitylene and cyclohexanone and the second solvent is gamma-butyrolactone.

19. The composition of claim 16 wherein the polymeric coating additive is present in an amount from 0.5 to about 200 ppm.

20. The composition of claim 16 wherein the polymeric coating additive is present in an amount from about 1 to about 50 ppm.

21. The composition of claim 1 wherein the polymeric coating additive is selected from the group consisting of polyisoprenes, polybutenes, polybutadiene, hydrogenated polystyrenes, hydrogenated polystyrene/indene resins, poly(styrene-b-ethylene-co-propylene) and acrylate polymers and copolymers.

22. The composition of claim 21 wherein the component (a) is a thermosetting oligomer which is the reaction product of (i) a biscyclopentadienone of the formula:

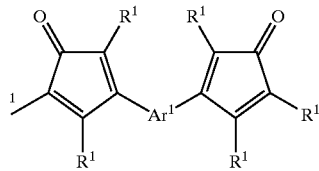

(ii) a polyfunctional acetylene of the formula:

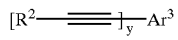

(iii) and, optionally, a diacetylene of the formula:

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety and y is an integer of three or more.

23. The composition of claim 21 wherein the solvent system comprises a solvent selected from n-methylpyrrolidinone, gamma-butyrolactone, mesitylene, cyclohexanone and mixtures thereof.

24. A composition suitable for coating to form thin films comprising:

(a) less than 40 percent by weight based on total weight of the composition of a polymer or oligomer, which is soluble or dispersible in organic solvents said polymer or oligomer is characterized in that it has a dielectric constant less than 4.0 or it is curable to form a cured polymer having a dielectric constant less than 4.0;

(b) a solvent system, comprising at least one organic solvent and (c) a polymeric coating additive in amounts less than about 1000 parts by weight per one million parts by weight of total composition, wherein the coating additive is the group consisting of polyisoprenes, polybutenes, polybutadiene, hydrogenated polystyrenes, hydrogenated polystyrene/indene resins, poly(styrene-b-ethylene-co-propylene), and acrylate polymers and copolymers.

25. The composition of claim 24 wherein component (a) is a thermosetting oligomer which is the reaction product of (i) a biscyclopentadienone of the formula:

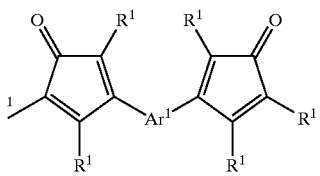

(ii) a polyfunctional acetylene of the formula:

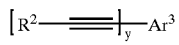

(iii) and, optionally, a diacetylene of the formula:

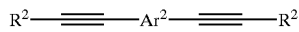

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety and y is an integer of three or more.

26. The composition of claim 24 wherein component (a) has the general formula:

wherein A has the structure:

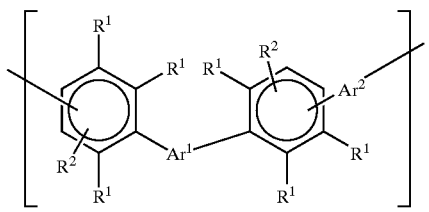

and B has the structure:

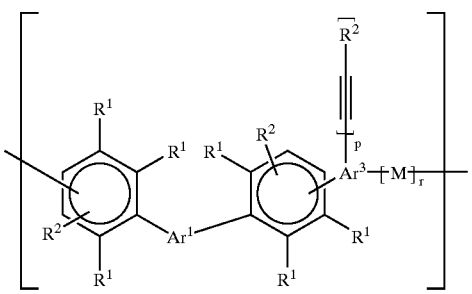

wherein EG are end groups having one or more of the structures:

EG =

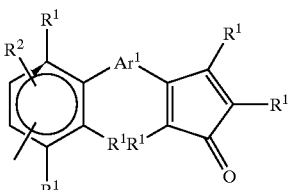

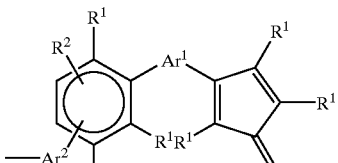

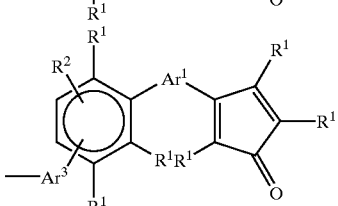

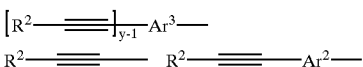

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety, M is a bond and y is an integer of three or more, p is the number of unreacted acetylene groups in the given mer unit, r is one less than the number of reacted acetylene groups in the given mer unit and p+r=y−1, z is an integer from 1 to 1000; w is an integer from 0 to 1000 and v is an integer of two or more.

27. The composition of claim 25 wherein the oligomer has a number average molecular weight of more than about 6000 and the amount of polymeric coating additive is less than 50 ppm.

28. A method comprising applying the composition of claim 1 to a substrate and spinning the substrate to form a layer of component (a).

29. A method comprising applying the composition of claim 16 to a substrate and spinning the substrate to form a layer of component (a).

30. A method comprising applying the composition of claim 24 to a substrate and spinning the substrate to form a layer of component (a).

31. The method of claim 28 wherein the layer is characterized in that striations are not detectable at a magnification of 100×.

32. The composition of claim 1 wherein the polymeric coating additive does not affect the material properties of the thin film.

33. The composition of claim 1 wherein the polymeric coating additive is present in amounts less than 500 parts per million.

34. The composition of claim 1 wherein the polymeric coating additive is essentially free of Si or F.

35. The composition of claim 21 wherein the acrylate copolymer is a copolymer of two different alkyl acrylates.

36. The composition of claim 24 wherein the acrylate copolymer is a copolymer of two different alkyl acrylates.

37. The method of claim 28 further comprising pyrloyzing the polymeric coating additive.

* * * * *